United States Patent [19]
Chen

[11] Patent Number: 5,180,347
[45] Date of Patent: Jan. 19, 1993

[54] CONTROLLING DEVICE WITH A ROAD CONDITION DISPLAY FOR AN EXERCISE BICYCLE

[76] Inventor: Hsi-Lin Chen, No. 171, Wuchuan Wu St., Taichung, Taiwan

[21] Appl. No.: 725,424

[22] Filed: Jul. 3, 1991

[51] Int. Cl.$^5$ .................. A63B 21/00; G09B 9/04
[52] U.S. Cl. ........................... 482/5; 482/8; 482/9; 482/64; 482/900; 434/69
[58] Field of Search ............ 482/57, 63, 5, 902, 482/1, 4, 8, 119, 120, 901, 903, 64; 273/148 B, 436, 442; 340/707; 358/142, 108; 434/61, 67, 69

[56] References Cited

U.S. PATENT DOCUMENTS

| | | | |
|---|---|---|---|
| 3,812,287 | 5/1974 | Lemelson | 358/108 |
| 3,903,613 | 9/1975 | Bisberg | 434/61 |
| 4,323,237 | 4/1982 | Jungerwirth | 482/119 |
| 4,358,105 | 11/1982 | Sweeney, Jr. | 482/901 X |
| 4,941,652 | 7/1990 | Nagano et al. | 482/903 X |
| 5,027,303 | 6/1991 | Witte | 482/8 X |
| 5,089,960 | 2/1992 | Sweeney, Jr. | 434/61 |

Primary Examiner—Richard J. Apley
Assistant Examiner—John P. Leubecker
Attorney, Agent, or Firm—Marger, Johnson, McCollom & Stolowitz

[57] ABSTRACT

A controlling device for a road condition display for an exercise bicycle comprises a picture device for providing a different motion picture of road conditions, a sensing device for sensing different road conditions and generating a train of corresponding pulses, an first counter for counting the number of these pulses, a frictional load device for generating various frictional resistances for the exercise bicycle, a pulse generator for generating at least one pulse when the frictional load device changes the frictional resistance, a second counter for counting the number of pulses from the pulse generator and records and updates the frictional load of the frictional load device, and a comparator for comparing the counted value of the first counter and the second counter and outputting a signal to trigger the frictional load device to update the load resistance according to the present motion picture.

6 Claims, 10 Drawing Sheets

CONTROLLING DEVICE WITH A ROAD CONDITION DISPLAY FOR AN EXERCISE BICYCLE

BACKGROUND OF THE INVENTION

The present invention relates to a controlling device for an exercise bicycle with a road condition display.

Exercise bicycles are widely used nowadays. A speedometer or the like is provided on an upper portion of an exercise bicycle for indicating the speed of rotation of the fly-resistance wheel of the exercise bicycle. Normally, there is only a frictional load applied on the fly-resistance wheel of the exercise bicycle. U.S. patent application Ser. No. 07/505,148, now U.S. Pat. No. 5,029,846, to Kuo Wo Hao for a "Control Device for simulating Road Cycling" discloses a control device which is provided on an upper end of an exercise bicycle including a lever arm and a cylinder and which has a profile of hills. The image of the profile of hills in the prior art is limited to mechanic pictures, which are not as impressive as real pictures from a movie camera. Therefore, the inventor introduces taped pictures to the present invention to gain a more realistic effect.

SUMMARY OF THE INVENTION

The primary object of the present invention is to provide a controlling device for responding to a moving picture and controlling a frictional load around a resistance wheel of an exercise bicycle.

Another object of the present invention is to provide a motion picture cooperating with a controlling device in an exercise bicycle, so that when an uphill climb is pictured, the frictional load on the resistance wheel is increased and when an even road is pictured, the frictional load on the resistance wheel is decreased.

Further objects and advantages of the present invention will become apparent from a careful reading of the detailed description provided hereinbelow, with appropriate reference to the accompanying drawings.

DETAILED DESCRIPTION OF THE INVENTION

This invention comprises two parts: a mechanical assembly and an electrical control circuit.

Figure 6:
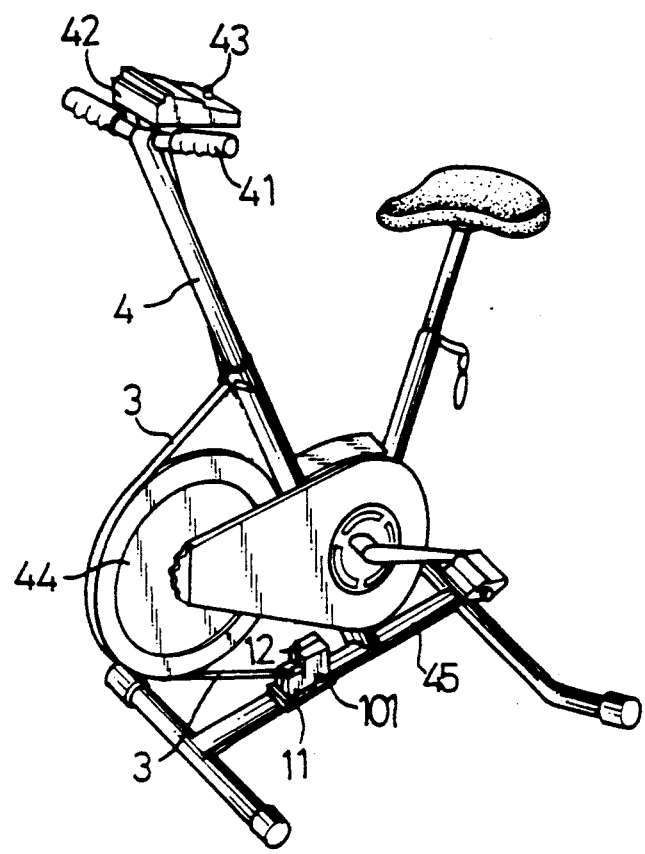
FIG. 6 is a perspective view of an exercise bicycle used in the present invention with the controlling device installed thereon.

Referring to FIG. 6, the exercise bicycle comprises a pair of handle bars 41 engaged at an intermediate position thereof to a neck 4, which is further engaged to a base frame 45. A resistance wheel 44 is enclosed with a tension belt 3, which along with an adjusting means 101, constitutes an adjustable frictional load of the exercise bicycle. The tension belt 3, with one end secured to the neck 4 and another side engaged to the adjusting means 101, contacts a portion of the resistance wheel 44 to generate frictional resistance thereon. A screen 42 for showing a continually moving picture is located on the intermediate position of a pair of handle bars 41. Because the whole structure of the exercise bicycle is conventional, it is not included in the scope of this invention, therefore not requiring to be described in further detail.

The inventive portion of the exercise bicycle includes an adjustable frictional load and a control circuit for controlling the adjustable frictional load in response to dynamic motion pictures shown on the screen 42.

Figure 1:
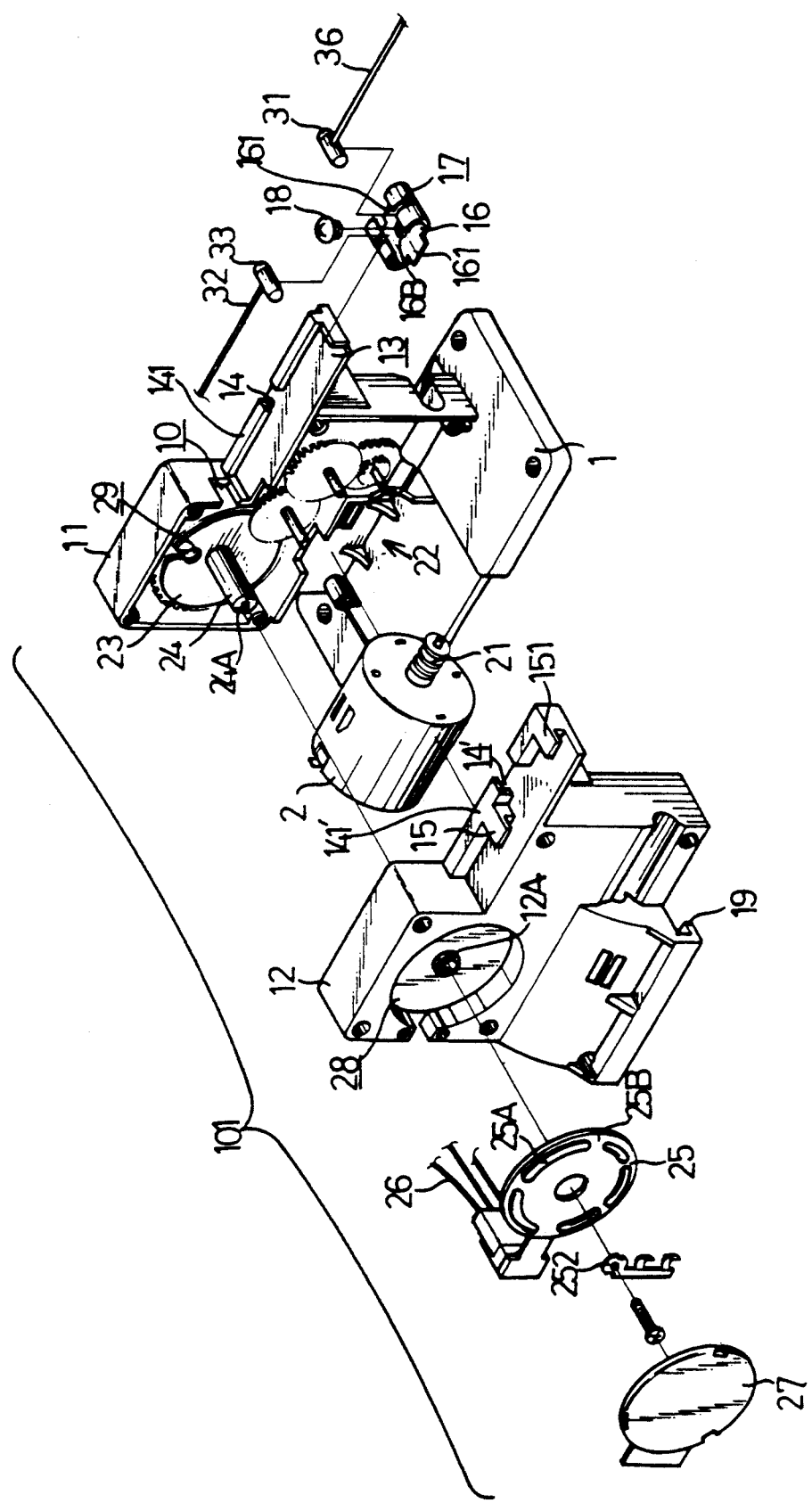
FIG. 1 is an exploded view of a mechanical assembly of a controlling device in accordance with the present invention.
Figure 2:
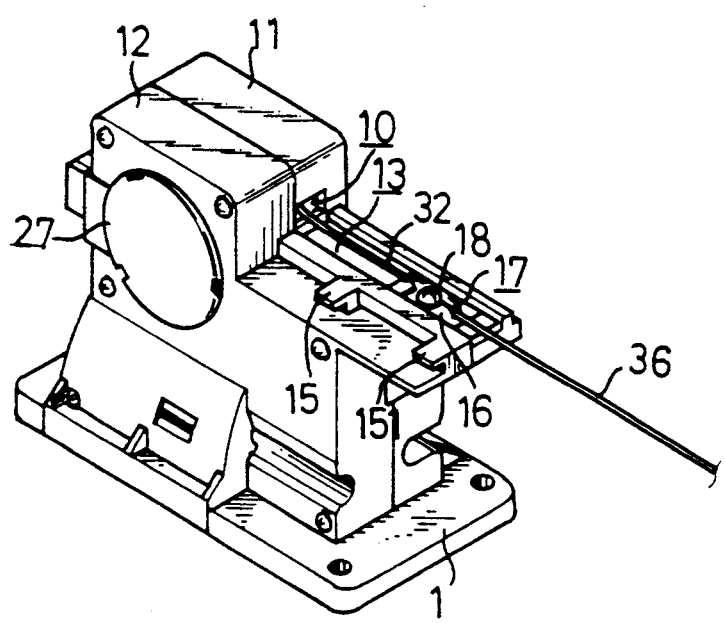
FIG. 2 is a perspective view of the mechanical assembly as shown in FIG. 1.
Figure 3:
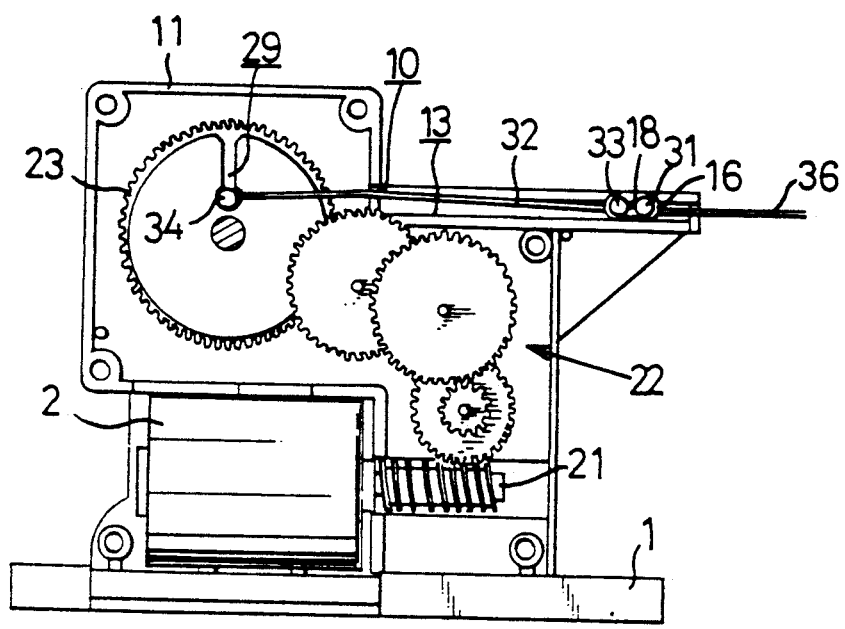
FIG. 3 is a sectional view of a frictional load means (a resistance wheel thereof not shown) of the present invention.
Figure 4:
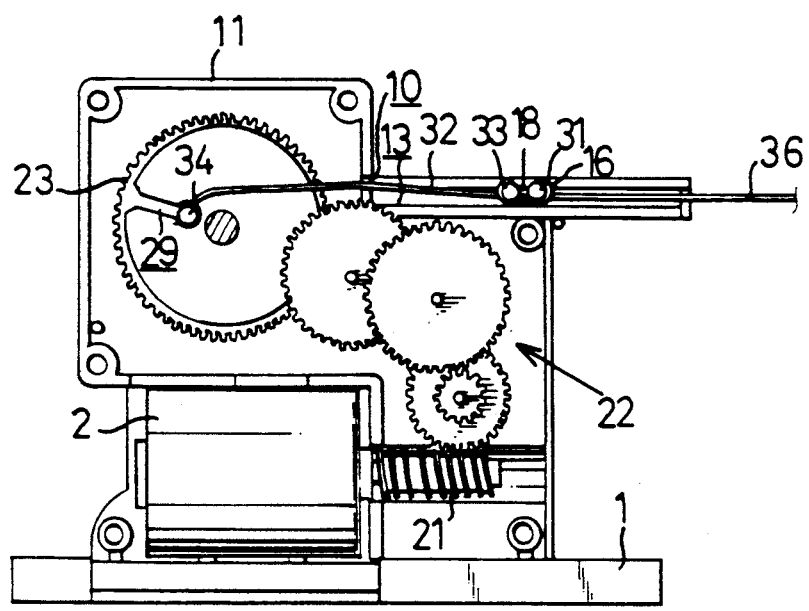
FIG. 4 is a view similar to FIG. 3, with a cable thereof being further extended.
Figure 5:
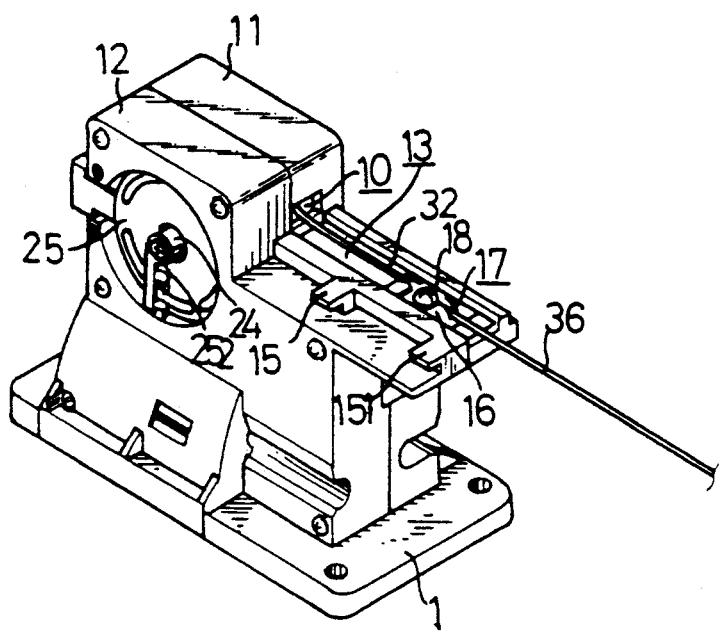
FIG. 5 is a view similar to FIG. 2 with a cover thereof removed.

Referring to FIGS. 1, 2, and 5, showing a detailed structure of the adjusting means 101. A base plate 1 has a first box 11 a second box 12, and a motor 2 mounted thereon, which together constitute the adjusting means 101. The first box 11 has a top surface portion formed by a first L-type protruding portion 141 which forms a first guiding groove 14 therebelow. The second box 12 has a top surface portion shaped as a second L-type protruding portion 141' defining a second guiding groove 14' therebelow. When the first box 11 and the second box 12 are mounted on the base plate 1, the space between the first protruding portion 141 and the second protruding portion 141' forms a rail 13.

A sliding piece 16 is formed as substantially an opened ellipsoid, with longitudinal front and rear ends thereof having a recess 17, lateral side thereof having a pair of protruding guiding plates 161, and a central bottom thereof having a threaded hole 16B to receive a retaining screw 18. A first cable 32 and a second cable 36, having a first cable head 33 and a second cable head 31 respectively, are received inside the sliding piece 16.

The tension belt 3 is exactly connected to the second cable 36 of the adjusting means 101. The retaining screw 18 is locked into the threaded hole 16B to retain the two cable heads 33 and 31 inside the sliding piece 16. The sliding piece 16 is located on the rail 13 to move forward and backward therealong, with protruding guiding plates 161 thereof being slidably received in the guiding grooves 14 and 14'. A first hole 10 is located on a side wall of the first box 11, which is adjacent to the rail 13 and allows the first cable 32 to pass therethrough.

A gear train 22 is located inside the first box 11. A first gear 23 of the gear train 22 has a slot 29 for receiving a first cable head 34 of the first cable 32, which passes through the first hole 10 and connects to the sliding piece 16 with another first cable head 33. A motor 2 is mounted on the base plate 1 and covered by the first box 11 and the second box 12. A worm 21 of the motor 2 is provided to drive the gear train 22, thereby driving the first gear 23, subsequently, pulling the first cable 32, the second cable 36. This action tightens or slackens the tension belt 3, thereby increasing or decreasing the frictional load (resistance) of the exercise bicycle, respectively.

Particularly, referring to FIG. 1, the first box 11, the base plate 1, and the second box 12 are assembled by securing an engaging portion 19 of the second box 12 to the base plate 1 and fixing to the first box 11. A cover 27 covers the second box 12 to prevent dusts or the like entering the second box 12.

Two positioning portions 15, and 151 extend from an outer side (opposite to an inner side which, incorporating with the first L-type protruding portion 141, forms a rail 13) of the second L-type protruding portion 141' for disposing a limiting switch (not shown) or a similar linking/sensing switch (not shown) for controlling an interval distance of the movement of the sliding piece.

A bearing 12A made of insulating material is disposed in the center of the second box 12. A shaft 24 of the first gear 23 extends through the second box 12. A recess 28 on the second box 12 is provided for receiving a discrete potential disk 25. The discrete potential disk 25, having a plurality of equally spaced conducting areas 25A and insulating areas 25B, is fitted in the recess 28 and engaged to the bearing 12A. The conducting areas 25A are connected to a DC (direct current) power source. A conductive sensing means 252 is engaged to the shaft 24 of the first gear 23 for sensing a discrete signal from the discrete potential disk 25. The motor 2 actuates the gear train 22 to rotate the first gear 23, which actuates the conductive sensing means 252 to rotate through at least one conducting area 25A of the discrete potential disk 25 and generate at least one pulse therefrom.

Figure 7:
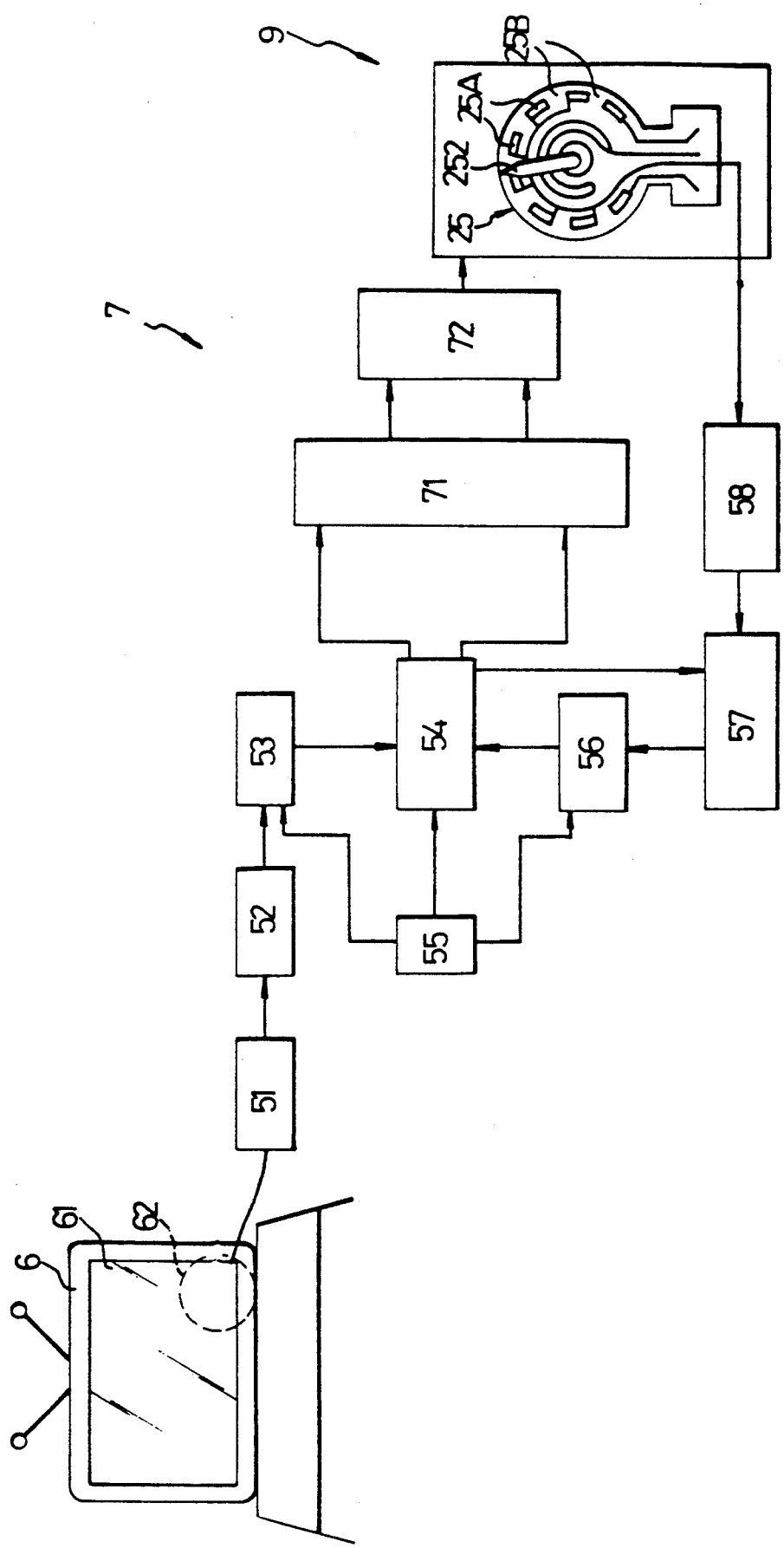
FIG. 7 is a block diagram of the controlling device of the present invention.

Referring to FIG. 7, a picture means 6 provides motion pictures of different road conditions. The picture means 6 may be, for example, a TV set with a video tape played thereon. An indicator 62 is located at a corner of the screen 61 of the picture means 6 and flashes with different frequencies in accordance with different road conditions.

The timing of the indicator 62 is divided into two portions: a signal-output period and an idle period. In the signal-output period, the indicator 62 flashes several times in proportion to the degree of difficulty of the road condition. The indicator 62 uses the same skill used in captioning, which is a conventional and not included in the scope of this invention. In the idle period, the indicator 62 does not flash. The signal-output period and the idle period proceed alternately.

A sensing means 51 is disposed in front of the indicator 62 and detects the flashing frequency thereof and sends out pulses detected therefrom to a first rectifier circuit 52. The first rectifier circuit 52 rectifies the pulses from the sensing means 51 to square pulses and couples these square pulses to a first counter means 53. The first counter means 53 counts each pulse during a signal-output period and holds the counting result during a following idle period. Each pulse is around 0.1 second.

A signal-output period together with an idle period constitute a task cycle around 10 seconds. In each task cycle, the first counter will count up to a specific value according to a corresponding signal from the sensing means 51. When a new signal-output period begins, a first pulse of a pulse train from the sensing means 51 will reset the first counter 53 and enable the latter to count from the beginning. A timing means 55 is connected to the first counter 53 to cooperate with the first pulse from the sensing means 51 to reset the first counter 53 every 10 seconds.

An output of the first counter 53 is supplied to a comparator 54. A second counter 56 is used to indicate a present magnitude of frictional load by updating a counted output, that is, the tightness of the frictional load is represented by a corresponding counted value (output) of the second counter 56. The counted output of the second counter 56 is coupled to the comparator 54 and compared therein with the output from the first counter 53. The comparator 54 is also reset by the first pulse from the sensing means 51, which is controlled by the timing means 55. The comparator 54 is triggered by the timing means 55 in a first one-third of a task cycle, which guarantees that the first counter 53 has finished counting, that is, the first counter 53 is in the idle period. The signal-output period varies depending on the difficulties of the road conditions shown on the screen. However, the signal-output period never exceeds one-fourth of a task cycle.

The comparator 54 compares the outputs from the first counter 53 and the second counter 55 and determines the direction of the motor 2, either forward or reverse.

A driving circuit 71 is connected to the comparator 54 for receiving an output signal therefrom and driving the motor 2 forward or reverse.

A frictional load means 72, comprising the motor 2, the gear set 22, the first cable 32, the sliding piece 16, the second cable 36, the tension belt 3, and the resistance wheel 44, is connected to the driving means 71 to tighten or slacken the resistance wheel 44 for updating or changing a dynamic frictional load according to the motion picture from the screen 42 of the exercise bicycle.

A pulse generator 9, comprising the discrete potential disk 25 and the conductive sensing means 252, serves to provide trigger pulses to the second counter 56 to update a magnitude of the present frictional load.

A second rectifier 58 is connected to the pulse generator 9 to rectify the pulses therefrom to square pulses.

An up-down controlling means 57 is connected to the second rectifier 58 to set the second counter 56 to count up or down.

Figure 8:
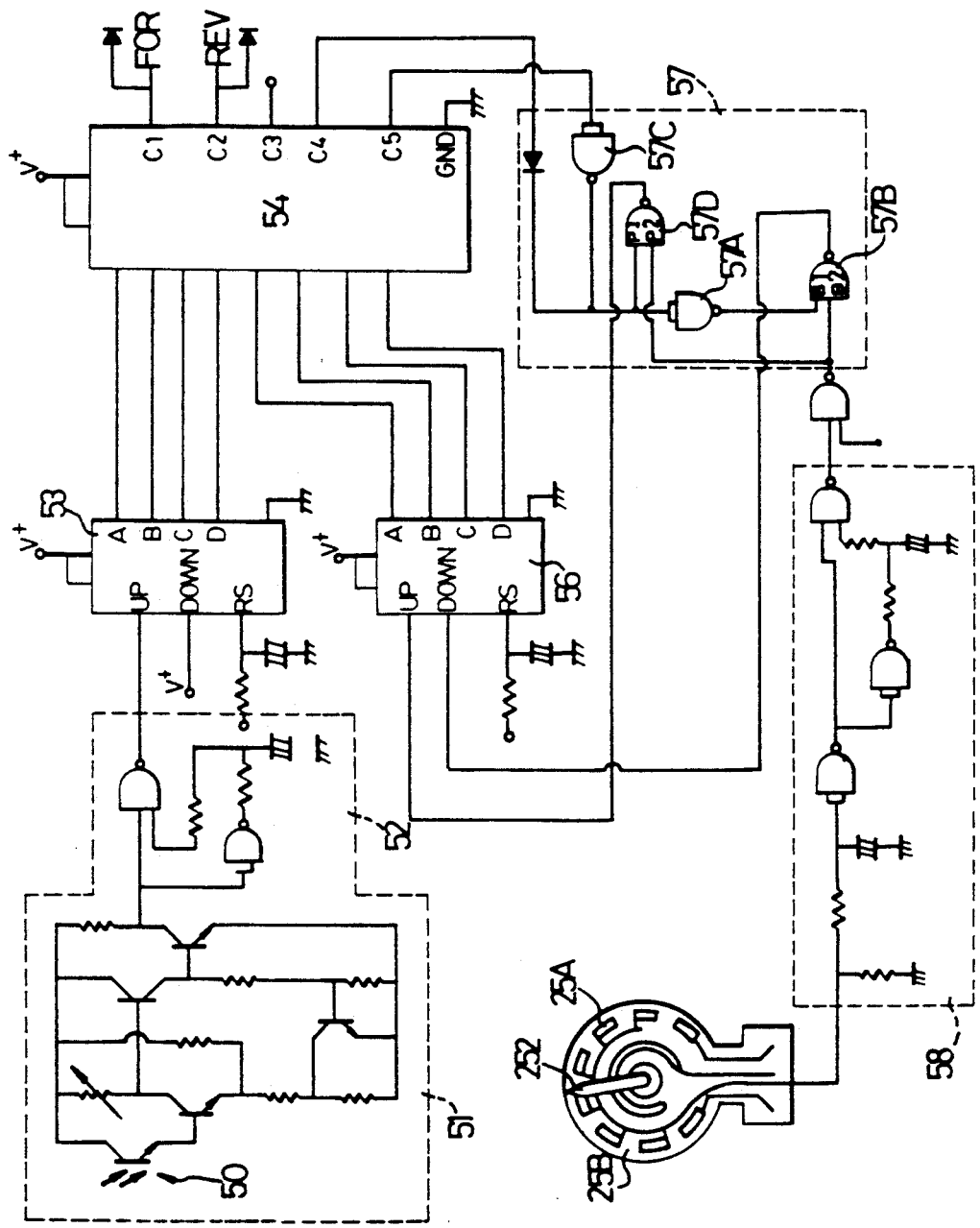
FIG. 8 is a schematic diagram of an electrical control circuit of the present invention.
Figure 9:
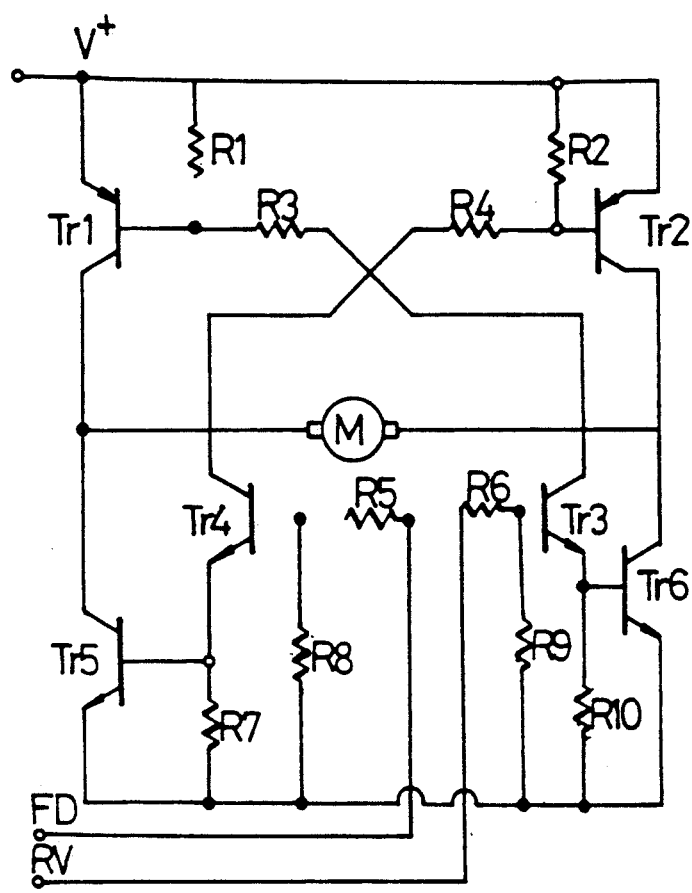
FIG. 9 is a circuit of a driving means of the present invention.
Figure 10:
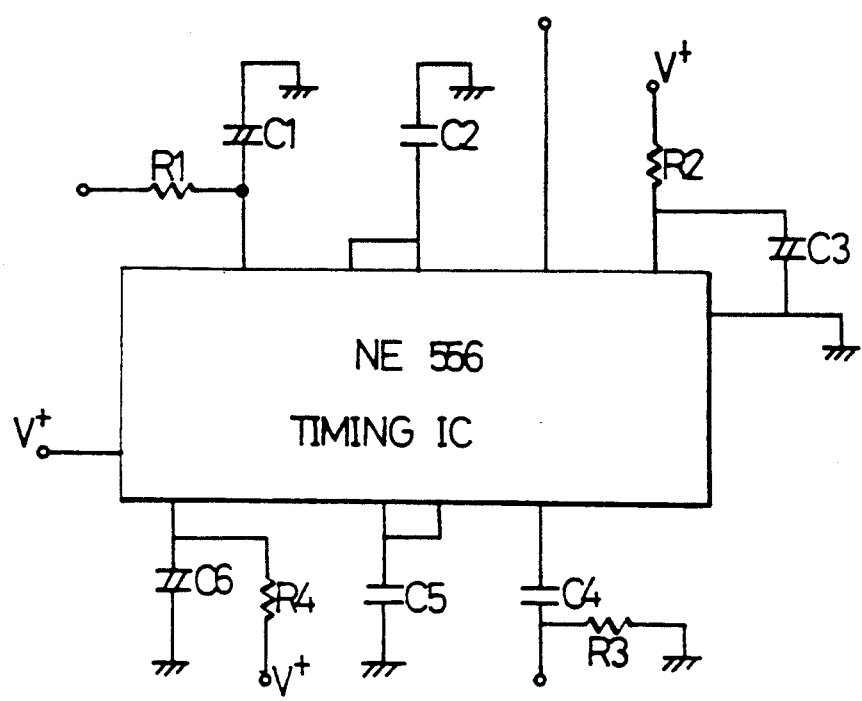
FIG. 10 is a schematic diagram of a timing/ controlling means of the present invention.

FIG. 8 is a more detailed view of the controlling circuit. Because most of the functions have been described above, the description hereafter merely explains some of the key functions.

The first counter 53 has a DOWN terminal connected a DC power source and an UP terminal connected to the second rectifier 52 and functions as an up-counter only.

The comparator 54 compares the counted outputs from the first counter 53 and the second counter 56 and has the following outputs:

(1) A first output C1 in a HIGH status indicates that the first counter 53 has an output greater than an output of the second counter 56, which triggers a forward rotation terminal in the driving circuit 71, thereby rotating the motor 2 in a forward direction.

(2) A second output C2 in a HIGH status indicates that the first counter 53 has an output smaller than an output of the second counter 56, which triggers a reverse rotation terminal in the driving circuit 71, thereby rotating the motor 2 in a reverse direction.

(3) A third output C3 in a HIGH status indicates that the first counter 53 has an output equal to an output of the second counter 56, which does not trigger the driving circuit 71, thereby, the motor 2 does not rotate.

A forth output C4 in a HIGH status indicates that the first counter 53 has an output greater than an output of the second counter 56, which is the same as C1, and is coupled to the up-down controlling means 57, which is, coupled to the second counter 56, so that when the motor 2 rotates in a forward direction, the second counter 56 counts up. The same status of the first output C1 and the forth output C4 synchronizes the second counter 56 and faithfully records a relative magnitude of the frictional load.

(5) A fifth output C5 in a HIGH status indicates that the first counter 53 has an output smaller than an output of the second counter 56, which is the same as the second output C2, and is coupled to the up-down controlling means 57, which is, coupled to the second counter 56, so that when the motor 2 rotates in a reverse direction, the second counter 56 counts down. The same status of the second output C2 and the fifth output C5 synchronizes the second counter 56 and faithfully records a relative magnitude of the frictional load.

The up/down controlling means 57 functions according to the statuses of the forth output C4 and the fifth output C5. When the forth output C4, the fifth output C5 are HIGH and LOW respectively, a diode DD1 is ON and, a first NAN-gate 57A (functioning as a NOT-gate here) has a LOW output at an input terminal B1 of a second NAN-gate 57B. The LOW input at the B1 terminal blocks the pulses from the second rectifier 58 to a DOWN input terminal of the second counter 56. The LOW of the fifth output C5 passes through a third NAN-gate 57C (functioning as a NOT-gate here) and is converted to a HIGH at an input terminal of a forth NAN-gate 57D. The HIGH input in D1 terminal permits the pulses from the second rectifier 58 passes through the fourth NAN-gate 57D and to an UP terminal of the second counter 56. Therefore, when the forth output C4 and the fifth output C5 are HIGH and LOW, respectively, the second counter will count up. For the same reason, when the fourth output C4 and the fifth output C5 are LOW and HIGH respectively, the second counter 56 will count down. When the outputs C4, C5, C1, and C2 are all LOW, the driving circuit 71 will not trigger the motor 2 to rotate or generate any pulses from the pulse generator 9 or, in turn, any pulses from the second rectifier 58; therefore, the second counter 56 does not count. This system is designed to achieve this situation before a substantially intermediate point of a task cycle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A controlling device with a road condition display for an exercise bicycle comprising:

a frictional load means comprising a motor, a gear set, a first cable, a sliding piece, a second cable, a tension belt, and a resistance wheel for generating various resistances said motor is engaged to said gear set, said gear set is connected to said first cable, said first cable is connected to said sliding piece, said sliding piece is engaged to said second cable, said second cable is engaged to said resistance wheel, said motor actuating said gear set, tightening or slackening said first cable, said sliding piece, and said second cable when said motor is electrically triggered by said driving means, thereby said resistance wheel experiences increased or decreased resistance respectively;

a picture means for providing a motion picture of different road conditions, having an indicator being displayed together with the motion picture and flashing at different frequencies in accordance with different road conditions; said indicator flashing in a signal-output period and not flashing in an idle period; said signal-output period and said idle period constituting a task cycle;

a sensing means disposed in front of said indicator for detecting the flashing frequencies thereof and sending out pulses to a first rectifier circuit; said first rectifier circuit rectifying pulses from said sensing means to square pulses and coupling said square pulses to a first counter means; said first counter means counting up or down for each pulse during a signal-output period, and holding a counting output during a following idle period; said counting output being further coupled to a comparator;

a second counter for indicating a present magnitude of a frictional load by updating a counted output thereof, whereby the tightness of the frictional load is represented by a corresponding output of said second counter, and said counted output being further coupled to a comparator;

a comparator for comparing the outputs from said first counter and said second counter and sending out a first output for controlling said motor to forwardly rotate, a second output for controlling said motor to reversely rotate, and a fourth output and a fifth output for controlling the second counter to count up or down;

a timing means electrically connected to said first counter and said comparator for cooperating therewith and resetting said first counter and said comparator at a first pulse of every task cycle, so that said first counter counts to a new value every task cycle and said comparator compares counted values from said first counter and said second counter;

a driving circuit electrically coupled to the first output and the second output of said comparator and to said frictional load means to drive the motor to rotate either forwardly or reversely;

a pulse generator electrically engaged to said frictional load means for generating at least one pulse in response to a changing resistance of said frictional load means;

a second rectifier electrically connected to said pulse generator for rectifying the pulse therefrom to a square pulse; and an up-down controlling means electrically connected to said second rectifier, said comparator, and said second counter, respectively, for setting said second counter to count up or down.

2. The controlling device as claimed in claim 1, wherein said first counter has a DOWN terminal connected to a DC power source and an UP terminal connected to said second rectifier and functions as an up-counter only.

3. The controlling device as claimed in claim 1, wherein:

said first output in a HIGH status triggers a forward revolution terminal in said driving circuit, thereby said motor rotates in a forward direction;

said second output in a HIGH status triggers a reverse revolution terminal in said driving circuit, thereby said motor rotates in a reverse direction;

said fourth output has the same status as said first output and is coupled to said up-down controlling means and to said second counter, so that said second counter counts up when said motor forwardly rotates; said first output and said fourth output having the same status synchronizes said second counter and records a magnitude of the frictional load;

said fifth output has the same status as said second output and is electrically coupled to said up-down controlling means and to said second counter, so that said second counter counts down when said motor reversely rotates; said second output and said fifth output having the same status synchronizes said second counter and records a magnitude of the frictional load.

4. The controlling device as claimed in claim 1, wherein said up-down controlling means functions according to statuses of said fourth output and said fifth output, so that said second counter counts up when said fourth output is HIGH and said fifth output is LOW; said second counter counts down when said fourth output is LOW and said fifth output is HIGH; and said driving circuit is inactive and said motor does not rotate when said first, second, fourth, and fifth outputs are all LOW, thereby no pulses are generated from said pulse generator and said second counter does not count.

5. The controlling device as claimed in claim 1, wherein said pulse generator comprises a discrete potential disk and a conductive sensing means; said discrete potential disk having a plurality of equally spaced conducting areas and insulating areas; said conducting areas being connected to a direct current power source; said conductive sensing means being engaged to a shaft of the gear set for sensing a discrete signal from said discrete potential disk, said conductive sensing means being driven to rotate by said motor via said gear train and said shaft, thereby sliding through at least one conducting area of said discrete potential disk and generate at least one pulse therefrom, so as to transmit said pulse being transmitted through said second rectifier to said second counter for updating the magnitude of the frictional load.

6. The controlling device as claimed in claim 1, wherein said motor is a DC motor.

* * * * *